US012609411B2

(12) United States Patent
Otsu et al.

(10) Patent No.: US 12,609,411 B2
(45) Date of Patent: Apr. 21, 2026

(54) METHOD OF PRODUCING ALL-SOLID-STATE BATTERY

(71) Applicants: TOYOTA JIDOSHA KABUSHIKI KAISHA, Toyota (JP); Panasonic Holdings Corporation, Kadoma (JP)

(72) Inventors: Kazuya Otsu, Miyoshi (JP); Akio Kaneyama, Hirakata (JP); Takaaki Tamura, Osaka-fu (JP)

(73) Assignees: TOYOTA JIDOSHA KABUSHIKI KAISHA, Toyota (JP); Panasonic Holdings Corporation, Kadoma (JP)

( * ) Notice: Subject to any disclaimer, the term of this patent is extended or adjusted under 35 U.S.C. 154(b) by 525 days.

(21) Appl. No.: 18/328,435

(22) Filed: Jun. 2, 2023

(65) Prior Publication Data

US 2024/0079722 A1     Mar. 7, 2024

(30) Foreign Application Priority Data

Jun. 6, 2022     (JP) ................................. 2022-091399

(51) Int. Cl.
*H01M 50/403*      (2021.01)
*H01M 50/491*      (2021.01)

(52) U.S. Cl.
CPC ....... *H01M 50/403* (2021.01); *H01M 50/491* (2021.01)

(58) Field of Classification Search
CPC ............ H01M 50/403; H01M 50/491; H01M 2300/0068; H01M 10/0562; Y02E 60/10; Y02P 70/50
See application file for complete search history.

(56) References Cited

U.S. PATENT DOCUMENTS

| | | | | |
|---|---|---|---|---|
| 2016/0380301 | A1* | 12/2016 | Kosaka ............. | H01M 10/0468 |
| | | | | 156/306.6 |
| 2020/0343580 | A1* | 10/2020 | Yushin .............. | H01M 10/0565 |
| 2024/0014367 | A1* | 1/2024 | Lee ........................ | H01M 4/623 |

FOREIGN PATENT DOCUMENTS

| | | | |
|---|---|---|---|
| JP | 11-185733 | A | 7/1999 |
| JP | H11185733 | A  * | 7/1999 |
| JP | 2001-243944 | A | 9/2001 |

* cited by examiner

*Primary Examiner* — Michael Y Sun
(74) *Attorney, Agent, or Firm* — Sughrue Mion, PLLC

(57) ABSTRACT

A method of producing an all-solid-state battery comprises preparing a second slurry which is a solid electrolyte slurry, and applying the second slurry to a foundation layer using a die head to form a solid electrolyte layer. A pressure P of the second slurry and a viscosity $\eta$ of the second slurry inside the die head at a predetermined shear rate satisfy a relationship of $P/4\eta<4$. The foundation layer has a porosity within a range of 30% to 50%.

2 Claims, 6 Drawing Sheets

100

SLURRY VISCOSITY η

INSIDE-HEAD PRESSURE P

SHEAR RATE v

POROSITY OF
FOUNDATION
LAYER

FIG.7

| | EVALUATION CONDITIONS | | | | | | | | EVALUATION RESULTS |
| | APPLICATION | | | | | FOUNDATION LAYER | | | |
| | INSIDE-HEAD PRESSURE P (Pa) | SLURRY VISCOSITY $\eta$ (Pa·s) | $P/4\eta$ | SHEAR RATE v (1/s) | FLOW SPEED (mm/s) | POROSITY Vp (%) | COMPOSITE MATERIAL DENSITY Dp (g/cm³) | TRUE DENSITY D0 (g/cm³) | NUMBER OF AIR BUBBLES (per 1 cm²) |
|---|---|---|---|---|---|---|---|---|---|
| EXAMPLE 1 | 2500 | 295 | 2.1 | 19 | 1.9 | 40% | 1.8 | 3 | 0 |
| EXAMPLE 2 | 4600 | 295 | 3.9 | 19 | 3.9 | 40% | 1.8 | 3 | 0 |
| EXAMPLE 3 | 2500 | 295 | 2.1 | 19 | 1.9 | 50% | 1.5 | 3 | 0 |
| EXAMPLE 4 | 4600 | 295 | 3.9 | 19 | 3.9 | 50% | 1.5 | 3 | 0 |
| EXAMPLE 5 | 2500 | 295 | 2.1 | 19 | 1.9 | 30% | 2.1 | 3 | 0 |
| EXAMPLE 6 | 4600 | 295 | 3.9 | 19 | 3.9 | 30% | 2.1 | 3 | 0 |
| EXAMPLE 7 | 9000 | 600 | 3.8 | 80 | 16.0 | 50% | 1.5 | 3 | 0 |
| COMPARATIVE EXAMPLE 1 | 5000 | 270 | 4.6 | 17 | 2.6 | 40% | 1.8 | 3 | 0.07 |
| COMPARATIVE EXAMPLE 2 | 12000 | 185 | 16.2 | 52 | 7.8 | 40% | 1.8 | 3 | 0.48 |
| COMPARATIVE EXAMPLE 3 | 5000 | 270 | 4.6 | 17 | 2.6 | 50% | 1.5 | 3 | 0.10 |
| COMPARATIVE EXAMPLE 4 | 12000 | 185 | 16.2 | 52 | 7.8 | 50% | 1.5 | 3 | 1.15 |
| COMPARATIVE EXAMPLE 5 | 2500 | 295 | 2.1 | 34.5 | 5.2 | 53% | 1.4 | 3 | 1.55 |
| COMPARATIVE EXAMPLE 6 | 4600 | 295 | 3.9 | 51.7 | 7.8 | 53% | 1.4 | 3 | 2.21 |

METHOD OF PRODUCING ALL-SOLID-STATE BATTERY

This nonprovisional application is based on Japanese Patent Application No. 2022-091399 filed on Jun. 6, 2022, with the Japan Patent Office, the entire contents of which are hereby incorporated by reference.

BACKGROUND

Field

The present disclosure relates to a method of producing an all-solid-state battery, and, more specifically, it relates to a method of producing an electrode assembly of an all-solid-state battery.

Description of the Background Art

Japanese Patent Laying-Open No. 2001-243944 discloses an electrode production apparatus in which an electrode composite material is applied to a current collector by flat screen printing. For the application of the electrode composite material, a die head is used.

SUMMARY

In a manufacturing process of an electrode assembly of an all-solid-state battery, a solid electrolyte layer is formed by applying a solid electrolyte slurry to a foundation layer using a die head. On this occasion, air bubbles may form in the solid electrolyte layer due to various causes described later. In this case, the positions where air bubbles are formed may be recessed. As a result, properties and reliability of the all-solid-state battery may be degraded.

The present disclosure is devised for solving the above-described problem, and an object of the present disclosure is to improve properties and reliability of an all-solid-state battery.

A method of producing an all-solid-state battery according to an aspect of the present disclosure comprises preparing a solid electrolyte slurry, and applying the solid electrolyte slurry to a foundation layer using a die head to form a solid electrolyte layer. A pressure P of the solid electrolyte slurry and a viscosity $\eta$ of the solid electrolyte slurry inside the die head at a predetermined shear rate satisfy a relationship of $P/4\eta<4$. The foundation layer has a porosity within the range of 30% to 50%.

In the above-described method, the following conditions are adopted: (1) the pressure P of the solid electrolyte slurry and the viscosity $\eta$ of the solid electrolyte slurry inside the die head at a predetermined shear rate satisfy a relationship of $P/4\eta<4$; and (2) the foundation layer has a porosity within the range of 30% to 50%. By this, as shown in the evaluation testing results described below, air bubble formation which may occur at the time of solid electrolyte layer formation can be inhibited. Hence, the above-described method can improve properties and reliability of an all-solid-state battery.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 shows the summary of conditions and results of evaluation testing.

DESCRIPTION OF THE PREFERRED EMBODIMENTS

Figure 1:
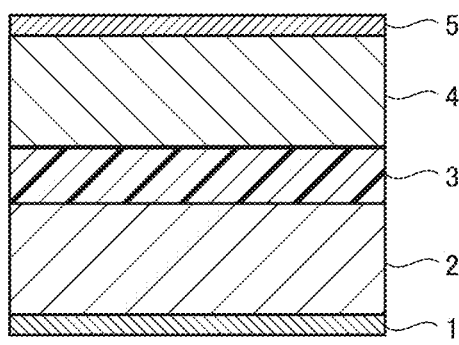
FIG. 1 shows an example configuration of an electrode assembly produced according to the present embodiment.

In the following, a detailed description will be given of embodiments of the present disclosure, with reference to drawings. In the drawings, members that are the same as or equivalent to each other are denoted by the same reference numeral, and description thereof will not be repeated.

Terms

A numerical range such as "from m % to n %" includes both the upper limit and the lower limit, unless otherwise specified. That is, "from m % to n %" means a numerical range of "not less than m % and not more than n %". Moreover, "not less than m % and not more than n %" includes "more than m % and less than n %". Further, any numerical value selected from a certain numerical range may be used as a new upper limit or a new lower limit.

EMBODIMENTS

Configuration of Electrode Assembly

FIG. 1 shows an example configuration of an electrode assembly produced according to the present embodiment. An electrode assembly 100 includes a base material 1, a foundation layer 2, a solid electrolyte layer 3, an active material layer 4, and a current collector 5.

Base material 1 is in sheet form, for example. Base material 1 may function as a current collector. Base material 1 may include metal foil. Base material 1 may be electrically conductive. Base material 1 includes, for example, at least one selected from the group consisting of aluminum (Al), nickel (Ni), chromium (Cr), copper (Cu), and iron (Fe).

Foundation layer 2 is located on base material 1. Foundation layer 2 is formed by application of a first slurry 91 to base material 1 (see FIG. 2). First slurry 91 thus applied to the surface of base material 1 may be dried, and thereby foundation layer 2 may be formed.

Solid electrolyte layer 3 is located on foundation layer 2. Solid electrolyte layer 3 is formed by application of a second slurry 92 to foundation layer 2 (see FIG. 2). Second slurry 92 thus applied to the surface of foundation layer 2 may be dried, and thereby solid electrolyte layer 3 may be formed. Solid electrolyte layer 3 may function as a separator inside an all-solid-state battery. Second slurry 92 corresponds to "a solid electrolyte slurry" according to the present disclosure.

Active material layer 4 is located on solid electrolyte layer 3. Active material layer 4 is formed by application of a third slurry 93 to solid electrolyte layer 3 (see FIG. 2). The polarity of active material layer 4 may be different from that of foundation layer 2. For example, foundation layer 2 may be a negative electrode active material layer and active material layer 4 may be a positive electrode active material layer. Alternatively, foundation layer 2 may be a positive electrode active material layer and active material layer 4 may be a negative electrode active material layer.

Current collector 5 is located on active material layer 4. As in the case of base material 1, current collector 5 may also include metal foil. For example, current collector 5 may be affixed to the outermost layer with an adhesive. Further, an external terminal (not shown) may be connected to base material 1 and current collector 5.

The number of layers of electrode assembly 100 is not particularly limited. Between base material 1 and current collector 5, not only the above-described three layers but also an additional layer (a fourth layer, a fifth layer, and the like) may be further stacked (not shown in the drawing).

Hereinafter, when first slurry 91, second slurry 92, and third slurry 93 are not differentiated from each other, they are collectively called a slurry 9. Slurry 9 may be prepared by mixing an active material, a conductive material, a solid electrolyte, a binder, and a dispersion medium, for example.

A negative electrode active material may include, for example, at least one selected from the group consisting of graphite, Si, $SiO_x$ (0<x<2), and $Li_4Ti_5O_{12}$. A positive electrode active material may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. $Li(NiCoMn)O_2$ may include $LiNi_{1/3}Co_{1/3}Mn_{1/3}O_2$, $LiNi_{0.5}Co_{0.2}Mn_{0.3}O_2$, $LiNi_{0.8}Co_{0.1}Mn_{0.1}O_2$, and/or the like, for example. $Li(NiCoAl)O_2$ may include $LiNi_{0.8}Co_{0.1}Al_{0.05}O_2$ and/or the like, for example.

The conductive material may form an electron conduction path. The amount of the conductive material to be used may be, for example, from 0.1 to 10 parts by mass relative to 100 parts by mass of the active material. The conductive material may include, for example, at least one selected from the group consisting of carbon black (CB), vapor grown carbon fiber (VGCF), carbon nanotube (CNT), and graphene flake (GF).

The solid electrolyte may form an ion conduction path. The solid electrolyte is in particle form. The solid electrolyte may have a particle size (D50) from 0.5 to 5 μm, for example. The amount of the solid electrolyte to be used may be, for example, from 1 to 200 parts by volume relative to 100 parts by volume of the active material. The solid electrolyte may include, for example, at least one selected from the group consisting of sulfide, oxide, and hydride. The solid electrolyte may include, for example, at least one selected from the group consisting of $LiI$—$LiBr$—$Li_3PS_4$, $Li_2S$—$SiS_2$, $LiI$—$Li_2S$—$SiS_2$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, $Li_2S$—$P_2S_5$, and $Li_3PS_4$.

The binder is capable of binding solid materials to each other. The amount of the binder to be used may be, for example, from 0.1 to 10 parts by mass relative to 100 parts by mass of the active material. The binder may include, for example, at least one selected from the group consisting of polyvinylidene difluoride (PVdF), vinylidene difluoride-hexafluoropropylene copolymer (PVdF-HFP), styrene-butadiene rubber (SBR), butadiene rubber (BR), and polytetrafluoroethylene (PTFE).

The dispersion medium is liquid. The dispersion medium may include a solvent such as water, organic solvent, and/or the like, for example. The dispersion medium may include water, N-methyl-2-pyrrolidone, butyl butyrate, and/or the like, for example.

<Method of Producing Electrode>

Figure 2:
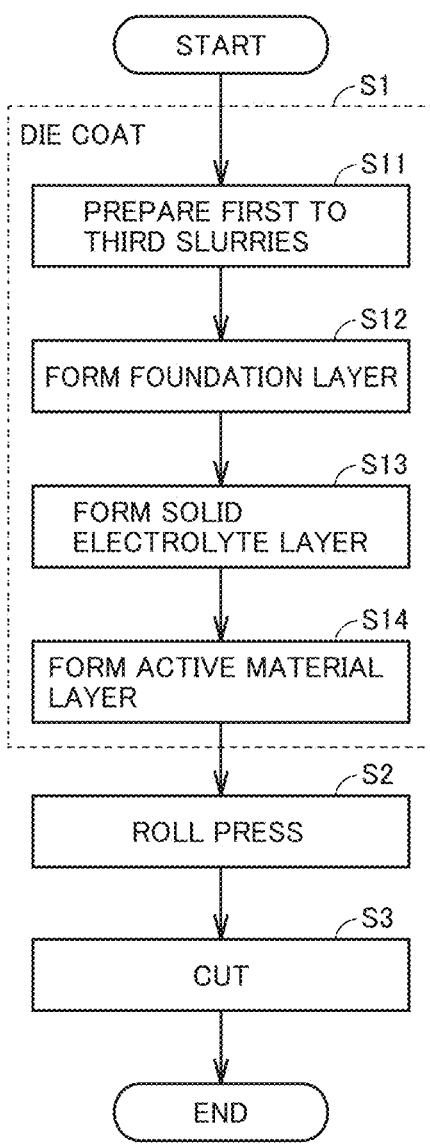
FIG. 2 is a schematic flowchart showing the entirety of a method of producing an electrode assembly according to an embodiment of the present disclosure.

FIG. 2 is a schematic flowchart showing the entirety of the method of producing electrode assembly 100 according to an embodiment of the present disclosure. The method of producing electrode assembly 100 includes a die coating step S1, a roll pressing step S2, and a cutting step S3.

Die coating step S1 includes a step S11 for preparing first slurry 91, second slurry 92, and third slurry 93, a step S12 for applying first slurry 91 to the surface of base material 1 to form foundation layer 2, a step S13 for applying second slurry 92 to the surface of foundation layer 2 to form solid electrolyte layer 3, and a step S14 for applying third slurry 93 to the surface of solid electrolyte layer 3 to form active material layer 4. Each of the steps for applying slurry 9 (S12 to S14) is carried out with the use of a die coater.

<Configuration of Die Coater>

Figure 3:
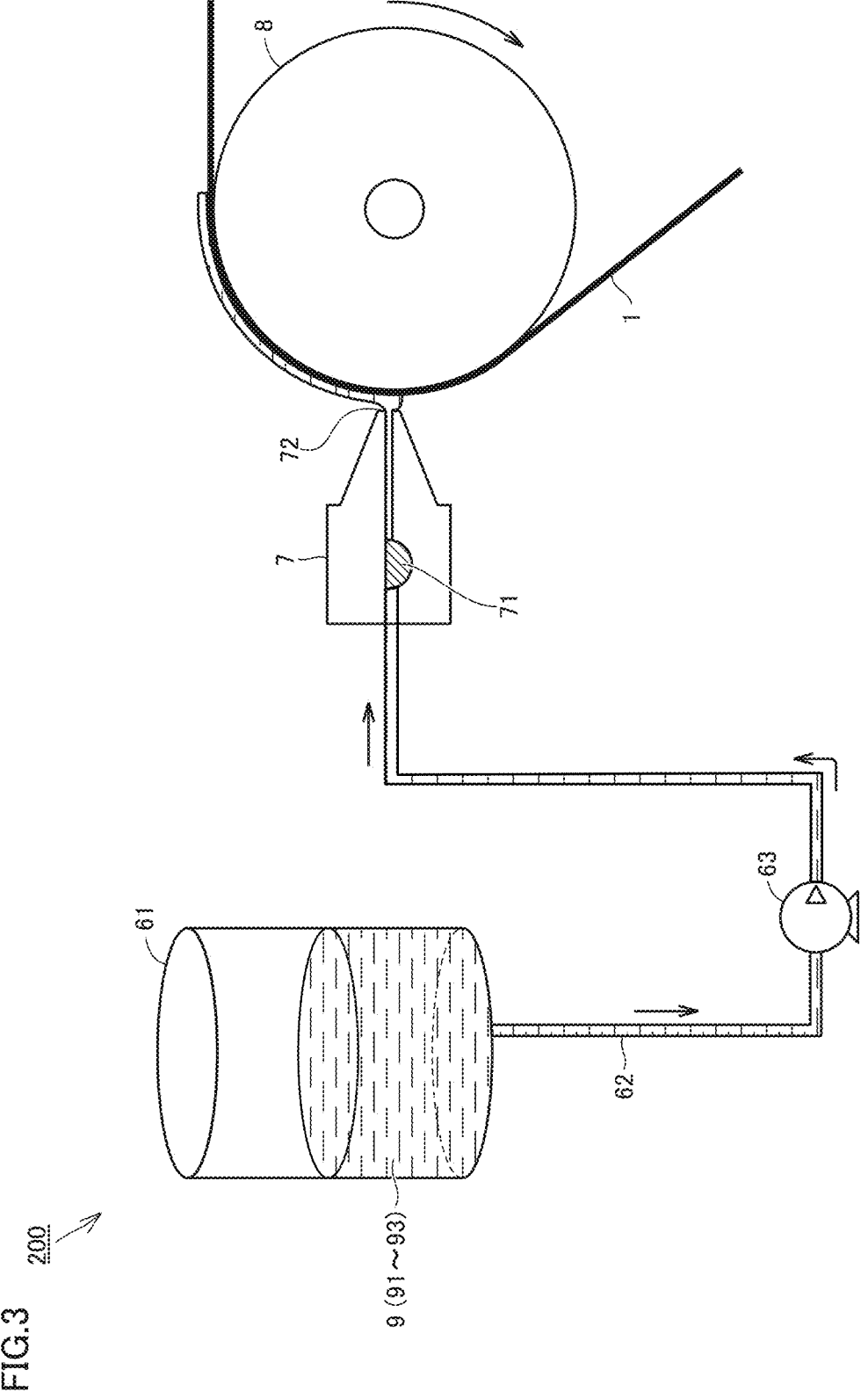
FIG. 3 shows an example configuration of a die coater.

FIG. 3 shows an example configuration of the die coater. A die coater 200 comprises a tank 61, a piping 62, a pump 63, a die head 7, and a back roller 8. In FIG. 3, step S12 for applying first slurry 91 to the surface of base material 1 is illustrated.

Tank 61 stores slurry 9 (which is first slurry 91 in this example). Piping 62 connects tank 61 to die head 7. Pump 63 feeds slurry 9 from tank 61 through piping 62 into die head 7. Slurry 9 thus fed into die head 7 enters into a manifold 71 within die head 7, and is then discharged from an outlet 72.

Back roller 8 rotates to transfer base material 1. Slurry 9 discharged from outlet 72 of die head 7 adheres to the surface of base material 1. By this, foundation layer 2 is continuously formed. Solid electrolyte layer 3 and active material layer 4 are also formed in the same manner (detailed description thereof is omitted).

<Air Bubble Formation>

In step S13 for applying second slurry 92 to foundation layer 2 to form solid electrolyte layer 3, air bubbles may form in second slurry 92.

Figure 4:
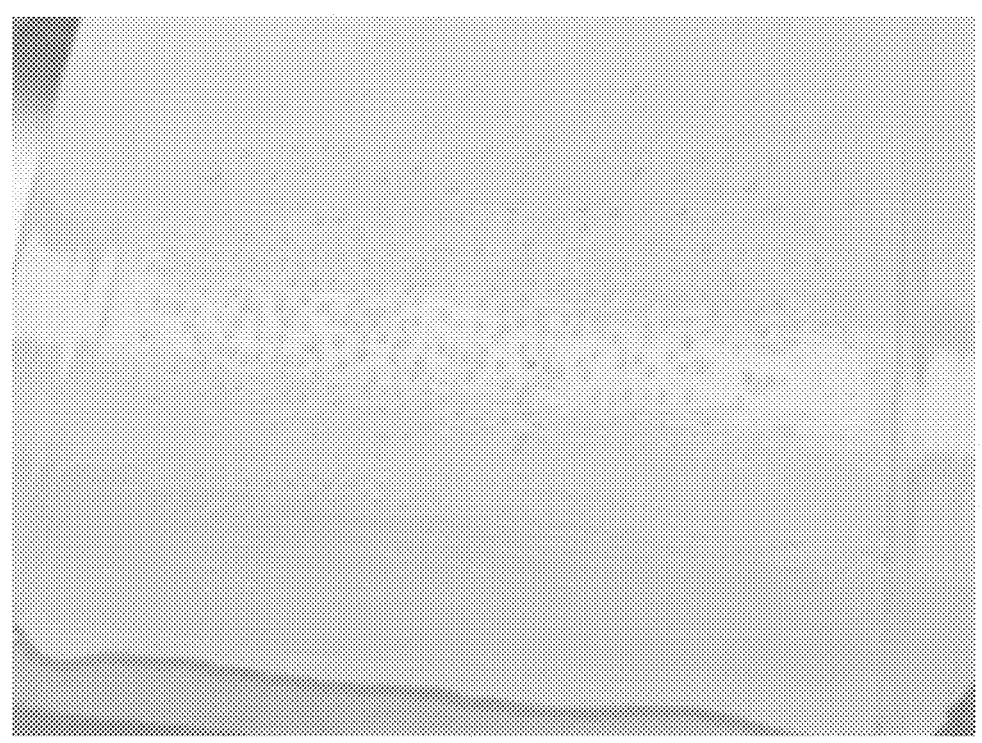
FIG. 4 is an image of a slurry in which air bubbles are formed.
Figure 5:
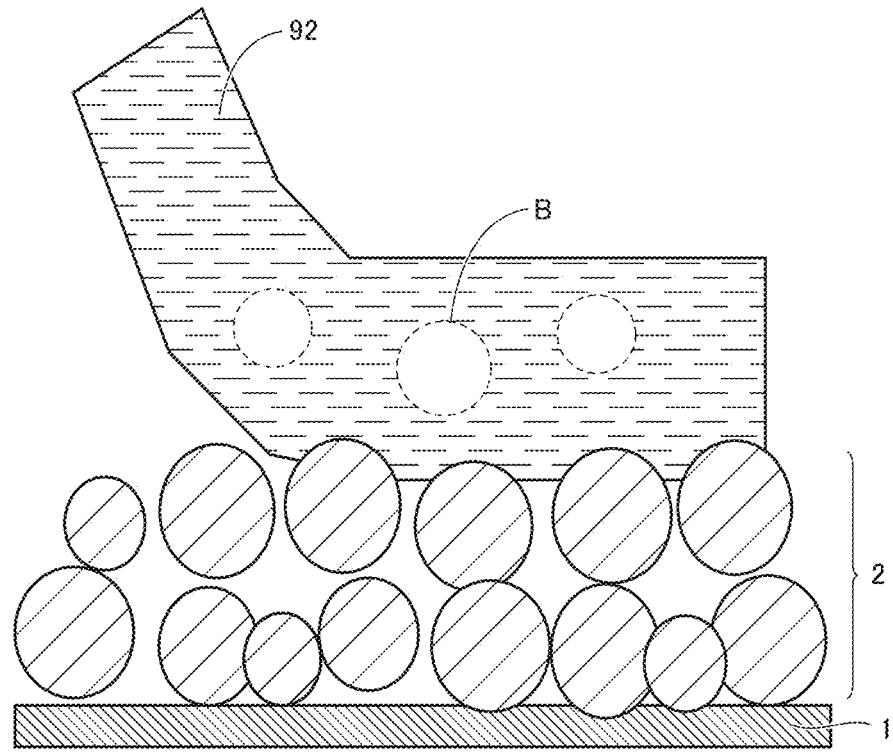
FIG. 5 is a descriptive view for a mechanism of air bubble formation.

FIG. 4 is an image of second slurry 92 in which air bubbles are formed. FIG. 5 is a descriptive view for a mechanism of air bubble formation. Second slurry 92 (more specifically, the solvent in the dispersion medium) may enter deep into pores of foundation layer 2. As a result, gas that is present inside foundation layer 2 is replaced by second slurry 92. The gas thus pushed out by second slurry 92 comes out from the surface of foundation layer 2 to form air bubbles. In FIG. 5, air bubbles are denoted by reference numeral B.

Figure 6:
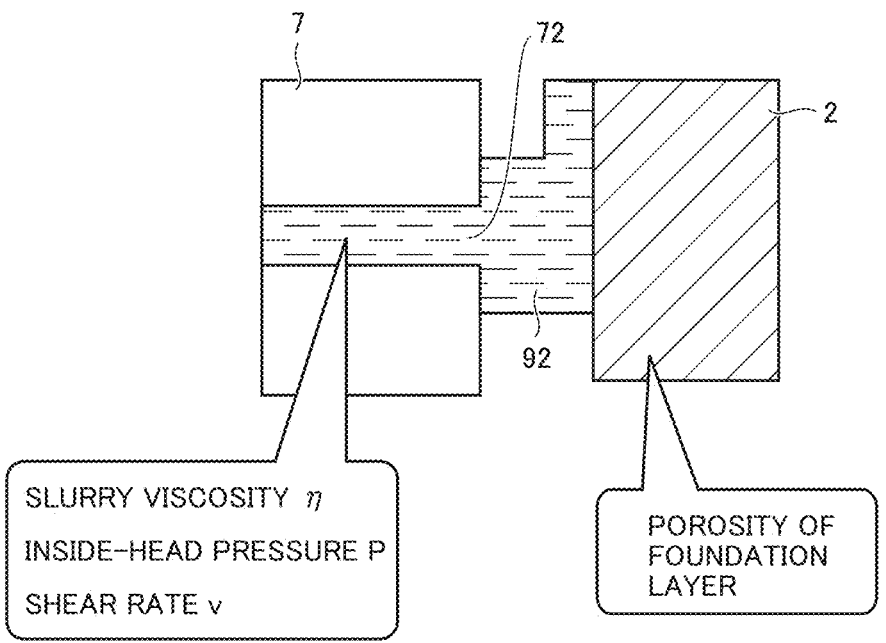
FIG. 6 is a descriptive view for parameters related to the conditions that affect air bubble formation.

FIG. 6 is a descriptive view for parameters related to the conditions that affect air bubble formation. It is conceivable that the number of air bubbles to be formed depends on the viscosity of second slurry 92, the pressure of second slurry 92 inside die head 7, the shear rate of second slurry 92, a porosity Vp of foundation layer 2, and/or the like. Hereinafter, the viscosity of second slurry 92 is also called "slurry viscosity η". The pressure of second slurry 92 inside die head 7 is also called "inside-head pressure P". The shear rate of second slurry 92 is also simply called "shear rate v". Slurry viscosity relative to each shear rate v, to be described below, may be measured with a cone/plate-type viscometer, for example. Inside-head pressure P may be measured with a pressure gauge designed for high-viscosity fluid measurement.

Between a depth h, which is the depth to which the solvent enters into foundation layer 2, and the size of pores formed inside foundation layer 2, there is a relationship as represented by the following equation (1).

$$h = \sqrt{\frac{Pr^2t}{4\eta}} \qquad (1)$$

Porosity Vp, as volume ratio, is calculated by the following equation (2). Composite material density Dp in equation (2) is determined by measuring the particle density of the active material powder with the use of a dry-mode automatic densimeter, for example. True density D0 is calculated theoretically from the crystal lattice constant of the same powder.

$$Vp=(1-Dp/D0)\times100[\%] \qquad (2)$$

If the positions in solid electrolyte layer 3 where air bubbles are formed are recessed, properties and reliability of the all-solid-state battery may be degraded. To prevent this, in the present embodiment, a particular configuration is adopted, where slurry viscosity $\eta$ at a predetermined shear rate v and inside-head pressure P satisfy a particular relational expression, and porosity Vp of foundation layer 2 is limited to a particular range. Specifically, slurry viscosity $\eta$ and inside-head pressure P satisfy a relational expression of P/4$\eta$<4, and porosity Vp of foundation layer 2 is limited to the range of 30% to 50%. This is because these limitations can make it possible to inhibit air bubble formation, according to the evaluation testing carried out by the present inventors as described below.

<Evaluation Testing>

FIG. 7 shows the summary of conditions and results of evaluation testing. Conditions of the evaluation testing include coating conditions, which include inside-head pressure P, slurry viscosity $\eta$, shear rate v, and the flow speed of slurry 9. Conditions of the evaluation testing further include parameters indicating the properties of foundation layer 2, which include porosity Vp, composite material density Dp, and true density D0.

The present inventors carried out evaluation testing of various combinations of coating conditions and specific parameters of foundation layer 2, as seen in Examples 1 to 7 and Comparative Examples 1 to 6 in FIG. 7. Each of Examples 1 to 7 was carried out under the conditions where "inside-head pressure P and slurry viscosity $\eta$ satisfy a relationship of P/4$\eta$<4, and porosity Vp is within the range of 30% to 50%". In contrast, in Comparative Examples 1 to 4, inside-head pressure P and slurry viscosity $\eta$ do not satisfy the relationship of P/4$\eta$<4. Moreover, in Comparative Examples 5 and 6, porosity Vp exceeds 50%.

Referring to FIG. 7, air bubbles were observed in Comparative Examples 1 to 6, while no air bubbles were formed in Examples 1 to 7. It indicates that adopting the above-described conditions can inhibit air bubble formation.

As described above, in the present embodiment, based on the results of evaluation testing shown in FIG. 7, the following conditions are adopted: "inside-head pressure P and slurry viscosity $\eta$ satisfy a relationship of P/4$\eta$<4, and porosity Vp is within the range of 30% to 50%". This can inhibit air bubble formation which may occur at the time of application of second slurry 92 to foundation layer 2. Accordingly, the present embodiment makes it possible to improve properties and reliability of an all-solid-state battery.

Although the embodiments of the present disclosure have been described, the embodiments disclosed herein are illustrative and non-restrictive in any respect. The scope of the present disclosure is defined by the terms of the claims, and is intended to encompass any modifications within the meaning and the scope equivalent to the terms of the claims.

The embodiments and examples disclosed herein are illustrative and non-restrictive in any respect. The technical scope indicated by the claims encompasses any modifications within the scope and meaning equivalent to the terms of the claims.

What is claimed is:

1. A method of producing an all-solid-state battery, the method comprising:

preparing a solid electrolyte slurry; and applying the solid electrolyte slurry to a foundation layer using a die head to form a solid electrolyte layer, wherein a pressure P of the solid electrolyte slurry and a viscosity $\eta$ of the solid electrolyte slurry inside the die head at a predetermined shear rate satisfy a relationship of P/4$\eta$<4, and the foundation layer has a porosity within a range of 30% to 50%.

2. The method of producing an all-solid-state battery according to claim 1, wherein the predetermined shear rate is from 19 (1/s) to 80 (1/s), and a flow speed of the solid electrolyte slurry inside the die head is from 1.9 (mm/s) to 16 (mm/s).

* * * * *